(12) United States Patent
Ke et al.

(10) Patent No.: US 9,648,246 B2
(45) Date of Patent: May 9, 2017

(54) CMOS VIDEO CAMERA AND METHOD FOR FILLING LIGHT

(71) Applicant: HANGZHOU HIKVISION DIGITAL TECHNOLOGY CO., LTD., Hangzhou (CN)

(72) Inventors: Changzhi Ke, Hangzhou (CN); Shuyi Chen, Hangzhou (CN); Luye Ge, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 14/895,368

(22) PCT Filed: Jan. 8, 2015

(86) PCT No.: PCT/CN2015/070310
§ 371 (c)(1),
(2) Date: Dec. 2, 2015

(87) PCT Pub. No.: WO2015/139519
PCT Pub. Date: Sep. 24, 2015

(65) Prior Publication Data
US 2016/0105597 A1 Apr. 14, 2016

(30) Foreign Application Priority Data
Mar. 20, 2014 (CN) .......................... 2014 1 0105788

(51) Int. Cl.
*H04N 5/235* (2006.01)
*H04N 5/225* (2006.01)
(Continued)

(52) U.S. Cl.
CPC ............. *H04N 5/2353* (2013.01); *G03B 7/16* (2013.01); *G03B 15/05* (2013.01); *H04N 5/2256* (2013.01);
(Continued)

(58) Field of Classification Search
CPC .. H02P 29/60; H02P 5/00; H02P 27/06; F25D 17/067; F25D 17/06; F25D 13/00;
(Continued)

(56) References Cited

U.S. PATENT DOCUMENTS

| 8,041,206 B2 * | 10/2011 | Tamura | .................. | G03B 15/03 |
| | | | | 348/371 |
| 2002/0081111 A1 * | 6/2002 | Ina | ......................... | G03B 15/05 |
| | | | | 396/155 |

(Continued)

FOREIGN PATENT DOCUMENTS

| CN | 101296541 A | 10/2008 |
| CN | 102427509 A | 4/2012 |

(Continued)

OTHER PUBLICATIONS

International Search Report (in English and Chinese) and Written Opinion of the Internatioal Searching Authority (in Chinese) for PCT/CN2015/070310), mailed Apr. 17, 2015; ISA/CN.

(Continued)

*Primary Examiner* — Roberto Velez
*Assistant Examiner* — Tuan Le
(74) *Attorney, Agent, or Firm* — Harness, Dickey & Pierce, P.L.C.

(57) ABSTRACT

The present disclosure provides a Complementary Metal Oxide Semiconductor (CMOS) video camera and method for filling light. The method includes: acquiring a frame interval and an exposure time of each line of pixels; determining a strobe period according to the acquired frame interval and exposure time of each line of pixels; and filling light for each frame of an image by using a light-filling lamp according to the determined strobe period and a predetermined duty cycle, wherein the predetermined duty cycle is larger than 0 and lower than 1. According to the present disclosure, the light-filling efficiency is improved, and the working life of the light-filling lamp is prolonged.

11 Claims, 3 Drawing Sheets

(51) Int. Cl.
*H04N 5/376* (2011.01)
*G03B 15/05* (2006.01)
*G03B 7/16* (2014.01)
*H04N 5/353* (2011.01)

(52) U.S. Cl.
CPC ......... *H04N 5/2354* (2013.01); *H04N 5/3765* (2013.01); *H04N 5/3532* (2013.01)

(58) Field of Classification Search
CPC .......... F25D 2700/14; F25D 2700/122; H04N 5/2353; H04N 5/3765; H04N 5/3532; H04N 5/2354; H04N 5/2256; G03B 15/05
See application file for complete search history.

(56) References Cited

U.S. PATENT DOCUMENTS

| | | | | |
|---|---|---|---|---|
| 2003/0007088 A1* | 1/2003 | Rantanen | ............. | H04N 5/2354 348/371 |
| 2008/0245952 A1* | 10/2008 | Troxell | ................. | G03B 15/05 250/208.1 |
| 2010/0165160 A1 | 7/2010 | Olmstead et al. | | |
| 2012/0154629 A1* | 6/2012 | Horiuchi | .............. | H04N 7/0127 348/226.1 |
| 2013/0201315 A1 | 8/2013 | Takei et al. | | |
| 2014/0139130 A1* | 5/2014 | Upton | ................ | H05B 33/0845 315/209 R |
| 2015/0138389 A1* | 5/2015 | Mishra | .................... | G06T 7/002 348/222.1 |
| 2015/0181139 A1* | 6/2015 | Kerbiriou | ............ | H04N 5/2256 348/297 |

FOREIGN PATENT DOCUMENTS

| | | |
|---|---|---|
| CN | 103595937 A | 2/2014 |
| EP | 1263215 A2 | 12/2002 |
| WO | 2013175908 A1 | 11/2013 |

OTHER PUBLICATIONS

European Search Report for Application No. 15764639.9 dated Dec. 5, 2016.

* cited by examiner

CMOS VIDEO CAMERA AND METHOD FOR FILLING LIGHT

CROSS-REFERENCE TO RELATED APPLICATIONS

This application is a U.S. National Phase Application under 35 U.S.C. §371 of International Application No. PCT/CN2015/070310, entitled "Complementary Metal Oxide Semiconductor Camera and Light Supplementation Method Therefor" and filed on Jan. 8, 2015, which claims priority to Chinese Application No. 201410105788.2, filed on Mar. 20, 2014. The entire contents of both of the above applications are hereby incorporated by reference.

FIELD OF THE DISCLOSURE

The present disclosure relates to video surveillance technologies, and more particularly to a Complementary Metal Oxide Semiconductor (CMOS) video camera and method for filling light.

BACKGROUND

With development and improvement of CMOS processing technologies, and by considering the price advantage of CMOS, a CMOS video camera using a CMOS image sensor has been used more and more widely in the field of video surveillance.

In order to improve imaging effect, it is required to fill light for the CMOS video camera in some cases. In the prior art, it is usually to apply a normally on light-filling lamp to fill light for the CMOS video camera.

SUMMARY

The present disclosure provides a CMOS video camera and method for filling light, which can improve the light-filling efficiency and prolong the working life of the light-filling lamp.

In order to achieve the above-described target, examples of the present disclosure are implemented as follows.

In an aspect, the present disclosure provides a method for filling light for a Complementary Metal Oxide Semiconductor (CMOS) video camera, the CMOS video camera using an exposure way of rolling shutter, comprising: acquiring a frame interval and an exposure time of each line of pixels; determining a strobe period according to the acquired frame interval and exposure time of each line of pixels; and filling light for each frame of an image by using a light-filling lamp according to the determined strobe period and a predetermined duty cycle, wherein the predetermined duty cycle is larger than 0 and lower than 1.

In another aspect, the present disclosure provides a Complementary Metal Oxide Semiconductor (CMOS) video camera, the CMOS video camera using an exposure way of rolling shutter, comprising: a light-filling control module and a lamp; wherein the light-filling control module is configured to acquire a frame interval and an exposure time of each line of pixels; determine a strobe period according to the acquired frame interval and exposure time of each line of pixels; and fill light for each frame of an image by using a light-filling lamp according to the determined strobe period and a predetermined duty cycle, wherein the predetermined duty cycle is larger than 0 and lower than 1.

In yet another aspect, the present disclosure provides a Complementary Metal Oxide Semiconductor (CMOS) video camera, the CMOS video camera using an exposure way of rolling shutter, comprising a memory, and one or more programs stored in the memory and configured for execution by the one or more processors, the one or more programs including instructions to: acquire a frame interval and an exposure time of each line of pixels; determine a strobe period according to the acquired frame interval and exposure time of each line of pixels; and fill light for each frame of an image by using a light-filling lamp according to the determined strobe period and a predetermined duty cycle, wherein the predetermined duty cycle is larger than 0 and lower than 1.

DETAILED DESCRIPTION

The inventors find that in the prior art, when applying a normally on light-filling lamp to fill light for a CMOS video camera, the light-filling lamp is always on when it is started until it is closed. In practical implementation, it is not required to fill light for the CMOS video camera all the time, but only in some specific time instants. Accordingly, the light-filling efficiency is reduced, and the working life of the light-filling lamp is decreased.

Generally, the exposure way of the CMOS video camera includes two kinds: global shutter and rolling shutter. In practical implementation, the exposure way of rolling shutter is used in most of CMOS video cameras.

Figure 1:
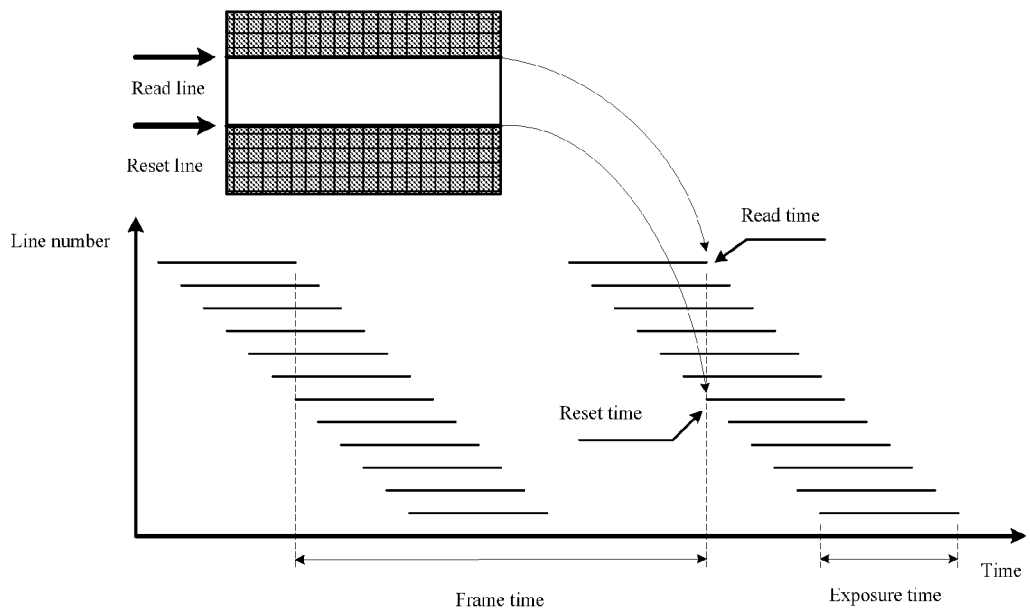
FIG. 1 is a schematic diagram illustrating an exposure way of rolling shutter according to the prior art.

FIG. 1 is a schematic diagram illustrating an exposure way of rolling shutter according to the prior art. As shown in FIG. 1, resetting charge and reading charge are operated in parallel. For each line of pixels, the time difference between a read time and a reset time are called as an exposure time. For each pixel, resetting charge data and reading charge data are both in serial, so that resetting, exposure and reading are operated in sequence line by line.

Examples of the present disclosure may be applied to the CMOS video camera using the exposure way of rolling shutter.

In order to make the object, technical solution and merits of the present disclosure clearer, the present disclosure will be illustrated in detail hereinafter with reference to the accompanying drawings and specific examples.

Figure 2:
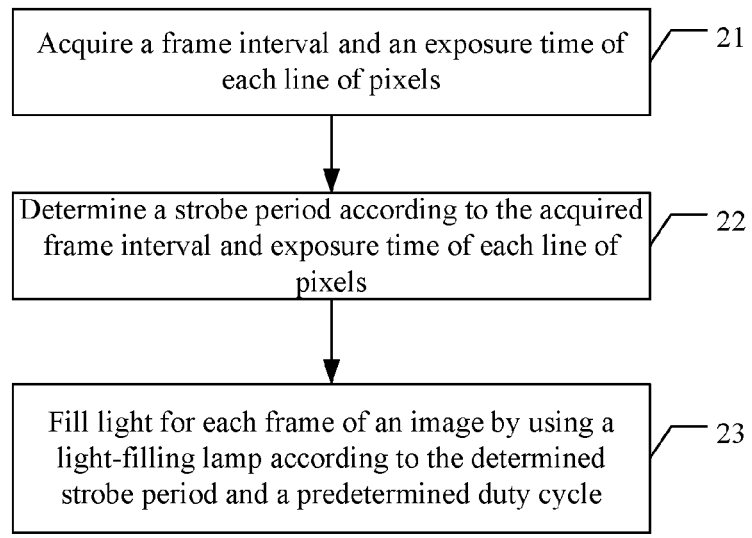
FIG. 2 is a flow chart illustrating a method for filling light for a CMOS video camera according to an example of the present disclosure.

FIG. 2 is a flow chart illustrating a method for filling light for a CMOS video camera according to an example of the present disclosure. The method includes the following procedures.

In Block 21, acquire a frame interval and an exposure time of each line of pixels.

Assume the frame rate of a CMOS video camera is 25 frames per second (fps), then the frame interval is equal to ¹⁄₂₅s, i.e., 40 ms.

In an example, the frame interval may be denoted by F*Tpixclk, exposure time of each line of pixels may be denoted by S*Tpixclk, wherein Tpixclk represents a clock cycle for outputting a pixel.

Figure 3:
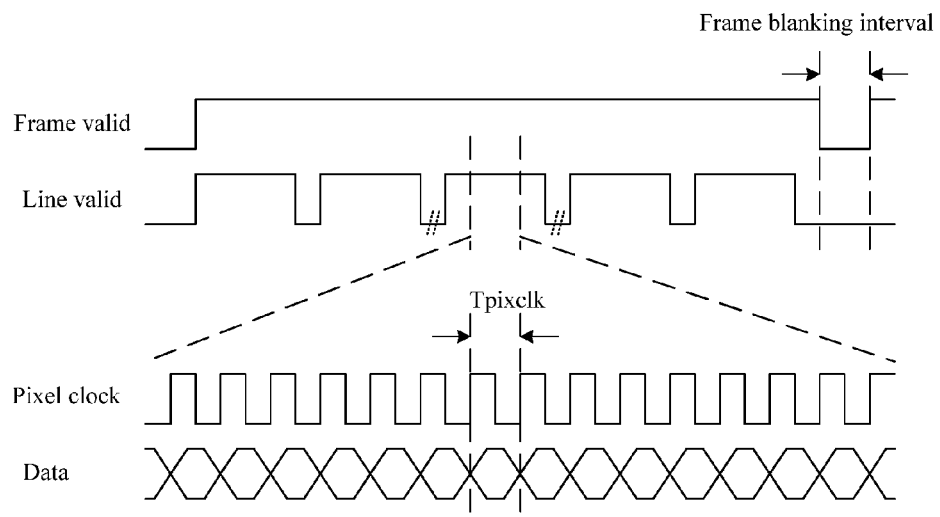
FIG. 3 is a schematic diagram illustrating output waveforms of image data of each frame according to the prior art.

FIG. 3 is a schematic diagram illustrating output waveforms of image data of each frame according to the prior art. As shown in FIG. 3, data of one pixel is output in a Tpixclk cycle.

F and S are both positive integers, and F>S. The specific values of F and S may be determined according to the working parameters of the CMOS video camera.

In Block 22, determine a strobe period according to the acquired frame interval and exposure time of each line of pixels.

There are two cases when determining the strobe period according to the acquired information as follows.

(1) F and S are not co-prime (i.e., there is another common divisor available besides 1)

In this case, a greatest common divisor T1 between F and S may be obtained, for example, by GCD (F, S)=T1, wherein GCD( ) represents a function of calculating the greatest common divisor.

Then, select a factor among factors of T1, multiply the selected factor by Tpixclk, and the multiplier is obtained as the strobe period. Which factor to be selected may be determined based on practical situations.

For example, assume T1=0, factors of 10 include 1, 2, 5 and 10. Then, one of 1*Tpixclk, 2*Tpixclk, 5*Tpixclk and 10*Tpixclk is selected as the strobe period.

(2) F and S are co-prime

In this case, there are two processing means:

(a) Means 1

Adjust a value of S slightly to make F and the slightly adjusted S to be not co-prime, and obtain a greatest common divisor T2 between F and the slightly adjusted S. The slightly adjusting refers to the adjustment made within a small range, which may include adjusting upwards or adjusting downwards. For example, a minimum adjustment step is 1, i.e., adjusting by adding 1 to S or subtracting 1 from S. This slight adjustment may affect the value of exposure time.

Or, adjust a value of F slightly to make the slightly adjusted F and S to be not co-prime, and obtain a greatest common divisor T2 between the slightly adjusted F and S. The slightly adjusting refers to the adjustment made within a small range, which may include adjusting upwards or adjusting downwards. For example, a minimum adjustment step is 1, i.e., adjusting by adding 1 to S or subtracting 1 from S. This slight adjustment may affect the value of frame rate.

Select a factor among factors of T2, multiply the selected factor by Tpixclk, and then the multiplier is obtained as the strobe period.

T2 may be the same with T1, or may be different from each other.

(b) Means 2

Select among positive integers between F−B and F a positive integer F1 to be not co-prime with S, and obtain a greatest common divisor T3 between F1 and S, i.e., GCD (F1, S)=T3, wherein B is a positive integer, and B<F, B*Tpixclk refers to a frame blanking interval in each frame of an image. As shown in FIG. 3, data during the frame blanking interval may be invalid.

Select a factor among factors of T3, multiply the selected factor by Tpixclk, and then the multiplier is obtained as the strobe period.

If there are more than one positive integer between F−B and F to be not co-prime with S, it may randomly select a positive integer as F1.

T3 may be the same with T2, or may be different from each other; similarly, T3 may be the same with T1, or may be different from each other.

In Block 23, fill light for each frame of an image by using a light-filling lamp according to the determined strobe period and a predetermined duty cycle, wherein the predetermined duty cycle is larger than 0 and lower than 1.

After the strobe period is determined, a light-filling lamp may be used to fill light for each frame of an image according to the strobe period and a predetermined duty cycle.

Assume the predetermined duty cycle of the light-filling lamp is 25%, a lighted duration is x, then the strobe period of the light-filling lamp is x+3x=4x.

In the example, the predetermined duty cycle is larger than 0 and lower than 1. When the duty cycle is 0, it indicates that no light is filled; when the duty cycle is 1, it indicates the normally on light filling is operated according to the prior art.

Figure 4:
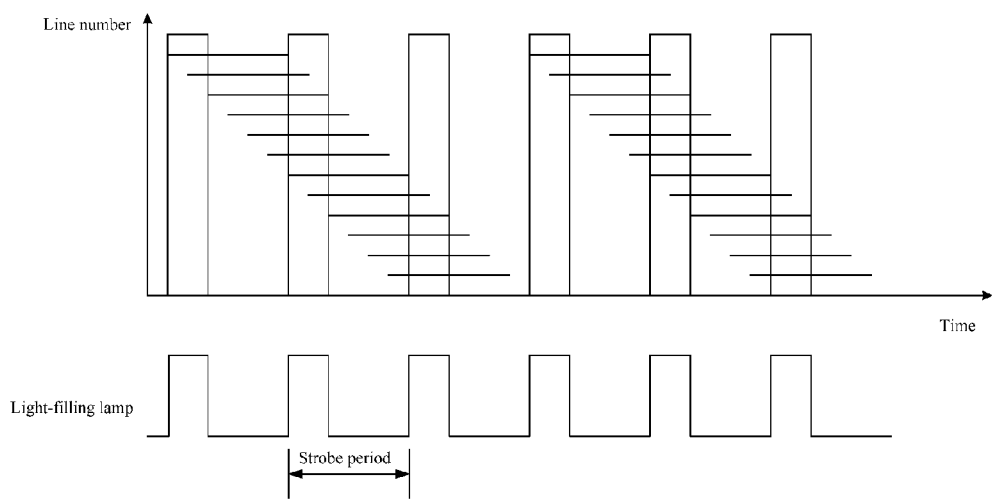
FIG. 4 is a schematic diagram illustrating a method for filling light according to an example of the present disclosure.

FIG. 4 is a schematic diagram illustrating a method for filling light according to an example of the present disclosure. Under the same state of working voltage, working current and lighted duration, the energy of each lightening by the light-filling lamp is the same, and the light-filling energy contributed to each line of pixels is also the same.

In addition, the method for filling light according to the above-described example may be used for each frame of an image, that is, starting from exposure of the first line till the end of the frame of the image, filling light for the frame of the image by using a light-filling lamp according to the determined strobe period and a predetermined duty cycle.

However, because it is not required to fill light during the frame blanking interval, in order to save energy, the following may be used for processing each frame of an image: starting from exposure of the first line of the frame of an image up till to a time instant of F1*Tpixclk, filling light for the frame of the image by using a light-filling lamp according to the determined strobe period and a predetermined duty cycle; and in the remained time, stopping filling light by closing the light-filling lamp.

The light-filling lamp may be a Light Emitting Diode (LED) lamp.

Figure 5:
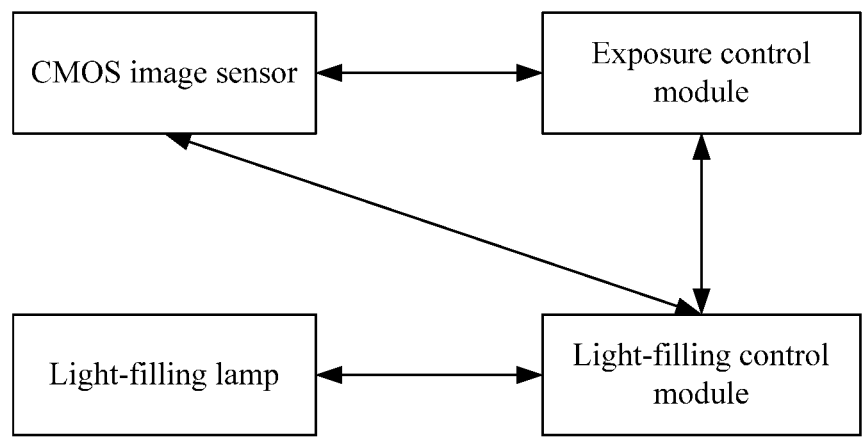
FIG. 5 is a schematic diagram illustrating a structure of a CMOS video camera according to an example of the present disclosure.

FIG. 5 is a schematic diagram illustrating a structure of a CMOS video camera according to an example of the present disclosure. As shown in FIG. 5, the CMOS video camera includes a light-filling control module and a light-filling lamp.

The light-filling control module is configured to acquire a frame interval and an exposure time of each line of pixels; determine a strobe period according to the acquired frame interval and exposure time of each line of pixels; and fill light for each frame of an image by using a light-filling lamp according to the determined strobe period and a predetermined duty cycle, wherein the predetermined duty cycle is larger than 0 and lower than 1.

In an example, the frame interval equals to F*Tpixclk, the exposure time of each line of pixels equals to S*Tpixclk, wherein both F and S are positive integers, F>S, and Tpixclk is a clock cycle for outputting a pixel.

The light-filling control module is configured to, when F and S are not co-prime, obtain a greatest common divisor T1 between F and S; select a factor among factors of T1, multiply the selected factor by Tpixclk, and obtain the multiplier as the strobe period.

In an example, the light-filling control module is configured to, when F and S are co-prime, adjust a value of S slightly to make F and the slightly adjusted S to be not co-prime, obtain a greatest common divisor T2 between F and the slightly adjusted S; select a factor among factors of T2, multiply the selected factor by Tpixclk, and obtain the multiplier as the strobe period.

In an example, the light-filling control module is configured to when F and S are co-prime, adjust a value of F slightly to make the slightly adjusted F and S to be not co-prime, obtain a greatest common divisor T2 between the slightly adjusted F and S; select a factor among factors of T2, multiply the selected factor by Tpixclk, and obtain the multiplier as the strobe period.

In an example, the light-filling control module is configured to, when F and S are co-prime, select among positive integers between F−B and F a positive integer F1 to be not co-prime with S, obtain a greatest common divisor T3 between F1 and S, wherein B is a positive integer, B<F, B*Tpixclk is a frame blanking interval in each frame of an image; select a factor among factors of T3, multiply the selected factor by Tpixclk, and obtain the multiplier as the strobe period.

In an example, the light-filling control module is further configured to, starting from exposure of a first line of the frame of an image to a time instant of F1*Tpixclk, fill light for the frame of an image by using a light-filling lamp according to the determined strobe period and the predetermined duty cycle; and in the remained time, stop filling light by closing the light-filling lamp.

In practical implementations, besides the above-described light-filling control module and light-filling lamp, the CMOS video camera may further include other parts, for example, as shown in FIG. 5, a CMOS image sensor and an exposure control module.

The CMOS image sensor is configured to perform photovoltaic conversion and collect a video image; the exposure control module is configured to control exposure of the CMOS image sensor.

The detailed implementation of the CMOS image sensor and the exposure control module may refer to the prior art, which is not described in details herein.

The light-filling control module may acquire a frame interval from the CMOS image sensor and an exposure time of each line of pixels from the exposure control module.

In particular, when the light-filling control module adjusts the value of S slightly, the light-filling control module notifies the slightly adjusted S to the exposure control module. Accordingly, the exposure control module may control the exposure of the CMOS image sensor according to the slightly adjusted S.

Figure 6:
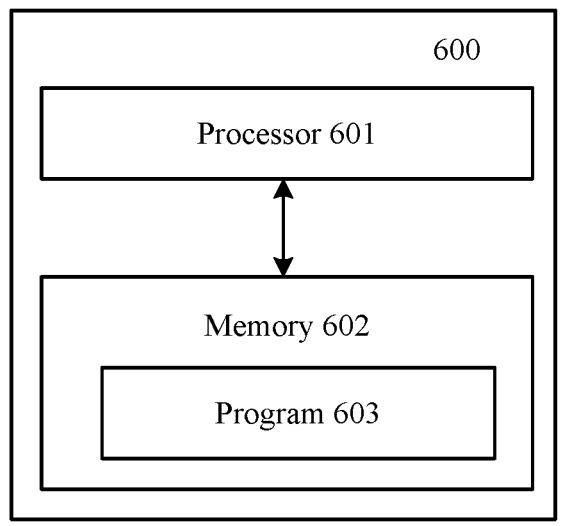
FIG. 6 is a schematic diagram illustrating a structure of a CMOS video camera according to an example of the present disclosure.

FIG. 6 is a schematic diagram illustrating a structure of a CMOS video camera according to an example of the present disclosure. As shown in FIG. 6, the CMOS video camera 600 includes one or more processors 601, a memory 602, and one or more programs 603 stored in the memory 602 and configured for execution by the one or more processors 601. The program 603 may include instructions to perform steps in the above-described method examples. The detailed description may refer to the method examples.

According to examples of the present disclosure, the light-filling lamp is not required to be always on, but to be lighted when required and be closed in remained time, so that the light-filling efficiency is improved, power consumption and energy of the light-filling lamp is reduced, and the working life of the light-filling lamp is prolonged. In addition, when the light-filling lamp is always on, the working current of the light-filling lamp should not be large enough; otherwise, the light-filling lamp may be destroyed, so that the working current of the light-filling lamp is generally limited to be small. According to examples of the present disclosure, the working current when the light-filling lamp is lighted may be much larger than the value when the light-filling lamp is always on. For example, the working current when the light-filling lamp is lighted is 4 times of the value when the light-filling lamp is always on, which enables the light-filling lamp to be lighted highly at a moment. Since the duration of being lighted highly is short, the light-filling lamp is not destroyed, but the physical objects moving in high speed in the image may be solidified at a moment, so that the effect of the image is enhanced.

The foregoing is preferred examples of the present disclosure, which is not used for limiting the protection scope of the present disclosure. Any modifications, equivalent substitutions and improvements made within the spirit and principle of the present disclosure, should be covered by the protection scope of the present disclosure.

What is claimed is:

1. A method for filling light for a Complementary Metal Oxide Semiconductor (CMOS) video camera, the CMOS video camera using an exposure way of rolling shutter, comprising:
   acquiring a frame interval and an exposure time of each line of pixels;
   determining a strobe period according to the acquired frame interval and exposure time of each line of pixels; and
   filling light for each frame of an image by using a light-filling lamp according to the determined strobe period and a predetermined duty cycle, wherein the predetermined duty cycle is larger than 0 and lower than 1;
   wherein the frame interval equals to F*Tpixclk, the exposure time of each line of pixels equals to S*Tpixclk, wherein both F and S are positive integers, F>S, and Tpixclk is a clock cycle for outputting a pixel;
   determining the strobe period according to the acquired frame interval and exposure time of each line of pixels comprising:
   when F and S are not co-prime, obtaining a greatest common divisor T1 between F and S;
   selecting a factor among factors of T1, multiplying the selected factor by Tpixclk, and obtaining the multiplier as the strobe period.

2. The method of claim 1, wherein
   when F and S are co-prime, adjusting a value of S slightly to make F and the slightly adjusted S to be not co-prime, obtaining a greatest common divisor T2 between F and the slightly adjusted S; and
   selecting a factor among factors of T2, multiplying the selected factor by Tpixclk, and obtaining the multiplier as the strobe period.

3. The method of claim 1, wherein
   when F and S are co-prime, adjusting a value of F slightly to make the slightly adjusted F and S to be not co-prime, obtaining a greatest common divisor T2 between the slightly adjusted F and S; and
   selecting a factor among factors of T2, multiplying the selected factor by Tpixclk, and obtaining the multiplier as the strobe period.

4. The method of claim 1, wherein
when F and S are co-prime, selecting among positive integers between F-B and F a positive integer F1 to be not co-prime with S, obtaining a greatest common divisor T3 between F1 and S, wherein B is a positive integer, B<F, B*Tpixclk is a frame blanking interval in each frame of an image; and
selecting a factor among factors of T3, multiplying the selected factor by Tpixclk, and obtaining the multiplier as the strobe period.

5. The method of claim 4, wherein
starting from exposure of a first line of the frame of an image to a time instant of F1*Tpixclk, filling light for the frame of an image by using a light-filling lamp according to the determined strobe period and the predetermined duty cycle; and
in the remaining time, stopping filling light by closing the light-filling lamp.

6. A Complementary Metal Oxide Semiconductor (CMOS) video camera, the CMOS video camera using an exposure way of rolling shutter, comprising: a light-filling control module and a lamp; wherein
the light-filling control module is configured to acquire a frame interval and an exposure time of each line of pixels; determine a strobe period according to the acquired frame interval and exposure time of each line of pixels; and fill light for each frame of an image by using a light-filling lamp according to the determined strobe period and a predetermined duty cycle, wherein the predetermined duty cycle is larger than 0 and lower than 1;
wherein the frame interval equals to F*Tpixclk, the exposure time of each line of pixels equals to S*Tpixclk, wherein both F and S are positive integers, F>S, and Tpixclk is a clock cycle for outputting a pixel;
the light-filling control module is configured to when F and S are not co-prime, obtain a greatest common divisor T1 between F and S; select a factor among factors of T1, multiply the selected factor by Tpixclk, and obtain the multiplier as the strobe period.

7. The CMOS video camera of claim 6, wherein
the light-filling control module is configured to when F and S are co-prime, adjust a value of S slightly to make F and the slightly adjusted S to be not co-prime, obtain a greatest common divisor T2 between F and the slightly adjusted S; select a factor among factors of T2, multiply the selected factor by Tpixclk, and obtain the multiplier as the strobe period.

8. The CMOS video camera of claim 6, wherein
the light-filling control module is configured to when F and S are co-prime, adjust a value of F slightly to make the slightly adjusted F and S to be not co-prime, obtain a greatest common divisor T2 between the slightly adjusted F and S; select a factor among factors of T2, multiply the selected factor by Tpixclk, and obtain the multiplier as the strobe period.

9. The CMOS video camera of claim 6, wherein
the light-filling control module is configured to when F and S are co-prime, select among positive integers between F-B and F a positive integer F1 to be not co-prime with S, obtain a greatest common divisor T3 between F1 and S, wherein B is a positive integer, B<F, B*Tpixclk is a frame blanking interval in each frame of an image; select a factor among factors of T3, multiply the selected factor by Tpixclk, and obtain the multiplier as the strobe period.

10. The CMOS video camera of claim 9, wherein the light-filling control module is further configured to starting from exposure of a first line of the frame of an image to a time instant of F1*Tpixclk, fill light for the frame of an image by using a light-filling lamp according to the determined strobe period and the predetermined duty cycle; and
in the remaining time, stop filling light by closing the light-filling lamp.

11. A Complementary Metal Oxide Semiconductor (CMOS) video camera, the CMOS video camera using an exposure way of rolling shutter, comprising a memory, and one or more programs stored in the memory and configured for execution by the one or more processors, the one or more programs including instructions to:
acquire a frame interval and an exposure time of each line of pixels;
determine a strobe period according to the acquired frame interval and exposure time of each line of pixels; and
fill light for each frame of an image by using a light-filling lamp according to the determined strobe period and a predetermined duty cycle, wherein the predetermined duty cycle is larger than 0 and lower than 1;
wherein the frame interval equals to F*Tpixclk, the exposure time of each line of pixels equals to S*Tpixclk, wherein both F and S are positive integers, F>S, and Tpixclk is a dock cycle for outputting a pixel;
determining the strobe period according to the acquired frame interval and exposure time of each line of pixels comprising:
when F and S are not co-prime, obtaining a greatest common divisor T1 between F and S;
selecting a factor among factors of T1, multiplying the selected factor by Tpixclk, and obtaining the multiplier as the strobe period.

* * * * *